United States Patent
Taylor et al.

(10) Patent No.: US 12,046,118 B2
(45) Date of Patent: *Jul. 23, 2024

(54) INTRA-VEHICLE SITUATIONAL AWARENESS FEATURING CHILD PRESENCE

(71) Applicant: Aptiv Technologies AG, Schaffhausen (CH)

(72) Inventors: Ronald M. Taylor, Greentown, IN (US); Mark W. Hudson, Russiaville, IN (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 374 days.

This patent is subject to a terminal disclaimer.

(21) Appl. No.: 17/579,575

(22) Filed: Jan. 19, 2022

(65) Prior Publication Data

US 2022/0148410 A1 May 12, 2022

Related U.S. Application Data

(63) Continuation of application No. 16/747,682, filed on Jan. 21, 2020, now Pat. No. 11,250,685.

(51) Int. Cl.
*G08B 21/02* (2006.01)
*G08B 21/18* (2006.01)

(52) U.S. Cl.
CPC .......... *G08B 21/182* (2013.01); *G08B 21/02* (2013.01)

(58) Field of Classification Search
CPC .............................. G08B 21/182; G08B 21/02
See application file for complete search history.

(56) References Cited

U.S. PATENT DOCUMENTS

| | | | |
|---|---|---|---|
| 6,323,487 B1 | 11/2001 | Wu | |
| 6,480,103 B1 * | 11/2002 | McCarthy | B60Q 3/30 73/23.3 |
| 6,932,769 B2 | 8/2005 | Griffin et al. | |
| 7,473,228 B2 | 1/2009 | Griffin et al. | |

(Continued)

FOREIGN PATENT DOCUMENTS

| | | |
|---|---|---|
| CN | 201114401 Y | 9/2008 |
| DE | 102016000273 A1 * | 7/2017 |
| DE | 102016000273 A1 | 7/2017 |

OTHER PUBLICATIONS

"Extended European Search Report Received mailed on Sep. 8, 2023", 13 Pages.

(Continued)

*Primary Examiner* — Nay Tun
(74) *Attorney, Agent, or Firm* — Billion and Armitage (57) ABSTRACT

A method of detecting occupants within a vehicle includes receiving camera data, thermal data and radar data with respect to the vehicle. The received data is stored to at least a first buffer and a second buffer, wherein the first buffer has a length associated with a first duration of time and the second buffer has a length associated with a second duration of time greater than the first duration of time. The camera data, thermal data, and radar data stored in the respective first and second buffers is analyzed to detect and track camera-based objects, radar-based objects, and thermal-based objects, which are utilized to generate an output indicating whether an occupant was detected.

20 Claims, 6 Drawing Sheets

(56) References Cited

U.S. PATENT DOCUMENTS

| | | |
|---|---|---|
| 7,791,670 B2 | 9/2010 | Fultz et al. |
| 8,190,331 B2 | 5/2012 | Browne et al. |
| 8,780,182 B2 | 7/2014 | Byren |
| 9,000,907 B1 | 4/2015 | Rembach et al. |
| 9,393,897 B2 | 7/2016 | Gomez-Collazo et al. |
| 9,469,176 B2 | 10/2016 | Boyer et al. |
| 9,604,588 B1 | 3/2017 | Rao et al. |
| 9,676,325 B1 | 6/2017 | Duan et al. |
| 9,796,371 B2 | 10/2017 | Soifer |
| 9,845,050 B1 | 12/2017 | Garza et al. |
| 10,074,028 B2 | 9/2018 | Gupta et al. |
| 10,102,729 B1 | 10/2018 | Hill |
| 10,134,258 B2 | 11/2018 | Chacon et al. |
| 10,195,988 B1 | 2/2019 | Garza et al. |
| 2001/0042976 A1 | 11/2001 | Breed et al. |
| 2001/0042977 A1 | 11/2001 | Breed et al. |
| 2002/0003345 A1 | 1/2002 | Stanley et al. |
| 2002/0080014 A1 | 6/2002 | McCarthy et al. |
| 2003/0201894 A1 | 10/2003 | Li |
| 2004/0094717 A1 | 5/2004 | Griffin et al. |
| 2004/0145456 A1 | 7/2004 | Mattes et al. |
| 2004/0155783 A1 | 8/2004 | Al-Sheikh |
| 2004/0215382 A1 | 10/2004 | Breed et al. |
| 2007/0013531 A1 | 1/2007 | Hules et al. |
| 2007/0055427 A1 | 3/2007 | Sun et al. |
| 2007/0229243 A1 | 10/2007 | Welch |
| 2008/0119989 A1 | 5/2008 | Henning et al. |
| 2008/0211668 A1 | 9/2008 | Dixon et al. |
| 2011/0163904 A1 | 7/2011 | Alland et al. |
| 2012/0105637 A1 | 5/2012 | Yousefi et al. |
| 2015/0055678 A1 | 2/2015 | Kawata |
| 2015/0130604 A1 | 5/2015 | Gomez Collazo et al. |
| 2016/0185317 A1 | 6/2016 | Bambico |
| 2016/0200168 A1 | 7/2016 | Boyer et al. |
| 2016/0200276 A1 | 7/2016 | Diewald |
| 2017/0043783 A1 | 2/2017 | Shaw |
| 2017/0046937 A1 | 2/2017 | Chacon et al. |
| 2017/0109987 A1 | 4/2017 | Auvenshine et al. |
| 2017/0136842 A1 | 5/2017 | Anderson et al. |
| 2017/0158186 A1 | 6/2017 | Soifer |
| 2017/0240022 A1 | 8/2017 | Ireri |
| 2017/0316278 A1 | 11/2017 | Guerreiro et al. |
| 2018/0029591 A1 | 2/2018 | Lavoie |
| 2018/0111506 A1 | 4/2018 | Penna |
| 2018/0126960 A1* | 5/2018 | Reibling ................. B60S 3/008 |
| 2018/0154903 A1 | 6/2018 | Song |
| 2018/0170213 A1 | 6/2018 | U-Dac et al. |
| 2018/0370431 A1 | 12/2018 | Wincek |
| 2019/0051173 A1 | 2/2019 | Kang |
| 2019/0084372 A1* | 3/2019 | Gallagher ............ A61B 5/6893 |
| 2019/0147262 A1 | 5/2019 | Kuehnle et al. |
| 2019/0152345 A1 | 5/2019 | Oranges |
| 2020/0331415 A1 | 10/2020 | Thomas |
| 2020/0398637 A1* | 12/2020 | Chang .................... G08B 21/02 |
| 2021/0039603 A1* | 2/2021 | Moeller ................ B60R 25/305 |

OTHER PUBLICATIONS

Cheng, Shinko Yuanhsien, et al., "Occupant Posture Analysis With Stereo and Thermal Infrared Video: Algorithms and Experimental Evaluation", IEEE Transactions on Vehicular Technology, IEEE, USA, vol. 53, No. 6, Nov. 1, 2004 (Nov. 1, 2004), pp. 1698-1712.
21150934.4 , "Extended European Search Report Received", 12 pages, dated Jun. 11, 2021 /NT/.

* cited by examiner

INTRA-VEHICLE SITUATIONAL AWARENESS FEATURING CHILD PRESENCE

CROSS REFERENCE TO RELATED APPLICATION

This application is a continuation application and claims the benefit of U.S. patent application Ser. No. 16/747,682 filed Jun. 21, 2020, the entire disclosure of each of which is hereby incorporated herein by reference.

FIELD

This disclosure is generally directed to safety systems and more specifically to an intra-vehicle situational awareness system for detecting the presence of occupants within a vehicle.

BACKGROUND

Vehicles exposed to full sun in the summer may experience extremely rapid rises of interior temperature, in excess of the outside temperature. For example, temperatures within a closed vehicle can reach temperatures approaching 250° F. For persons or animals located within the vehicle, heat prostration, disorientation and/or incapacitation can occur within a few minutes under such conditions.

A number of detection systems have been proposed for detecting occupants, including for example pressure sensors, computer vision systems, and others. However, due to the number of different possible conditions (e.g., number of occupants, location of occupants, movement of occupants within the vehicle, ambient lighting conditions) none of these systems provides perfect performance (i.e., each has false positives, false negatives). It would be beneficial to develop a system that reduces the number of false positives and false negatives, with the ultimate goal of providing a system and method of detecting occupants without faults.

SUMMARY

According to one aspect, a method of detecting occupants within a vehicle includes receiving camera data, thermal data and radar data with respect to the vehicle. The camera data, thermal data, and radar data are stored to at least a first buffer and a second buffer, wherein the first buffer has a length associated with a first duration of time and the second buffer has a length associated with a second duration of time greater than the first duration of time. The camera data stored in the first buffer and the second buffer is analyzed to detect and track camera-based objects, the radar data stored in the first buffer and the second buffer is analyzed to detect and track radar-based objects, and the thermal data stored in the first buffer and the second buffer is analyzed to detect and track thermal-based objects. Based on the detection and tracking of camera-based objects, radar-based objects, and thermal-based objects, an output is generated indicating whether an occupant was detected.

According to another aspect, an intra-vehicle situational awareness system includes a radar sensor configured to collect radar data, a camera configured to collect camera data, and an infrared sensor configured to collect thermal data. The system further includes a buffer for collecting sensor data, the buffer having a first buffer representing a first duration of time and at least a second buffer representing a second duration of time greater than the first duration of time, wherein radar data, camera data and thermal data is stored to both the first buffer and the second buffer. The system further includes a data fusion module configured to detect and track radar-based objects based on radar data provided in the first buffer and the second buffer, camera-based objects based on camera data provided in the first buffer and the second buffer, and thermal-based objects based on thermal data provided in the first buffer and the second buffer, wherein the data fusion module detects occupants based on the radar-based objects, camera-based objects, and thermal-based objects and generates an output in response to a detected occupant.

DETAILED DESCRIPTION

The present disclosure is directed to an intra-vehicle situational awareness system that relies on a plurality of sensor types, including radar, camera, and infrared (collectively referred to as a RACamIR sensor). Sensor data received from each of the respective sensors is buffered into at least a first buffer and a second buffer, wherein the first buffer stores data representing a first duration of time and the second buffer stores data representing a second duration of time greater than the first duration of time. In some embodiments, additional buffers may be utilized, each representative of a different duration of time.

Sensor data received from each of the sensors is analyzed within each respective buffer and is utilized to detect and track objects. Objects identified within each buffer are correlated with one another to verify/confirm the presence of an occupant. The fusion of data across different sensors and different buffers allows for the benefits of each type of sensor to be utilized while masking the weaknesses. For example, radar provides advantages in detecting motion and position independent of ambient conditions (e.g., low light) but provides poor classification. In contrast, camera data provides advantages in detection position and motion and classifying occupants but provides poor detection in low-light conditions and in differentiating between animate and inanimate objects. The thermal infrared sensor provides advantages in differentiating between animate/inanimate objects and operates well in low-light conditions but provides poor detection of position/motion. Combining data from each of the sensors, and based on different sample sizes, provides a more accurate determination of the presence of occupants resulting in fewer false positives and false negatives. In addition, the various types of sensor may provide better detection of occupants at different lengths of time. For example, thermal data provides better performance over longer periods of time as the background temperature varies or diverges from the temperature of occupants. Radar data, in contrast, operates best at shorter durations of time, detecting movement of the occupant on scale of milliseconds. Analyzing data from each sensor within different buffer lengths improves the overall detection of occupants, reducing false positives and false negatives.

In some embodiments additional data is provided by systems located on the vehicle, including one or more of time, location, outside air temperature, driving mode, (e.g., speed), structure, etc. This information is combined with the sensor data to provide situational awareness or content for interpreting the sensor data. For example, detection of an occupant in the car when the outside air temperature is 90° F. may provide a first type of response while detection of an occupant with the outside air temperature is 50° F. may provide a different type of response. In addition, this information can be utilized to put sensor data into context and may be utilized to determine the weight or reliability assigned to each output. For example, at night the camera data provided by the camera may be given less weight than the thermal data provided by the infrared sensor and/or the radar data provided by the radar sensor.

Figure 1:
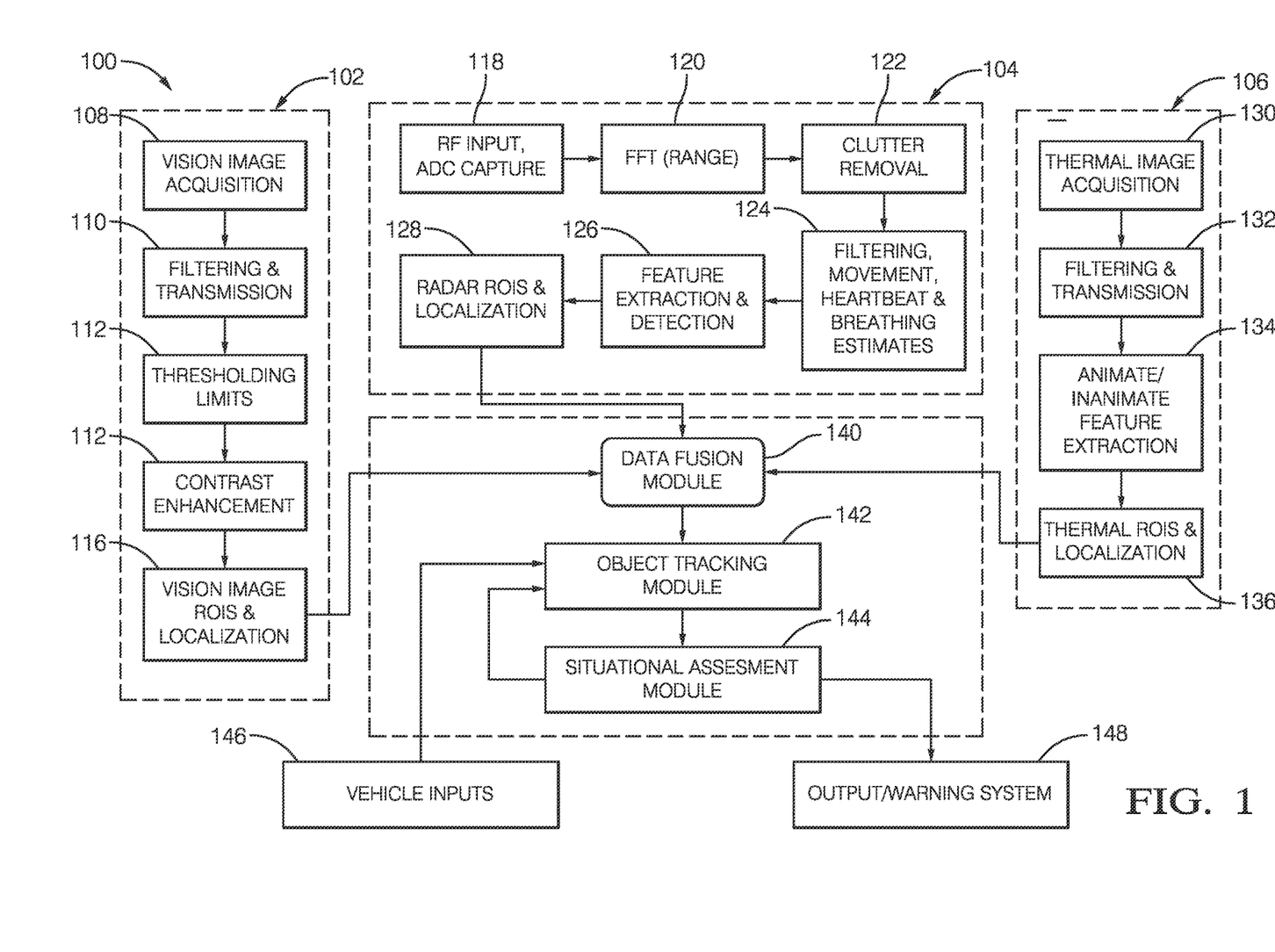
FIG. 1 is a block diagram illustrating an intra-vehicle situation awareness system (RACamIR) according to some embodiments.

FIG. 1 is a block diagram illustrating an intra-vehicle situation awareness system 100 according to some embodiments. System 100 includes a plurality of sensors, including camera 102, radar 104, infrared or thermal imaging 106, referred to collectively as "RACamIR". In some embodiments, each sensor includes local processing of the sensed data. That is, each sensor may include a local processor and memory for storing and performing one or more operations on the captured data. For example, camera sensor 102 may include a local processor (not shown) capable of providing one or more of filtering 110, thresholding 112, contrast enhancement 114, and detection of computer vision (i.e., camera-based) regions-of-interest (ROIs) and localization to the acquired images. Radar sensor 104 may include a local processor for providing one or more of fast Fourier transform (FFT) 120, clutter removal 122, filtering, movement heartbeat and breathing estimates 124, feature extraction and detection 126, and radar region-of-interests (ROIs) and localization. The infrared sensor 106 may include a local processor for providing one or more of filtering and transmission 132, animate/inanimate feature extraction 134 and thermal region-of-interest and localization 136.

In some embodiments, each sensor provides regions of interest/localization analysis to the temporal synchronization system 138. ROI/localization refers to identification within a field of view of the sensor of data that may be indicative of occupants. For example, with respect to radar provided by the radar sensor 104, ROI/localization 128 may include regions in which motion is detected. As discussed in more detail below, subsequent buffered temporal synchronization of the sensor data is utilized to detect the likelihood of an occupant being located in the vehicle. ROI/localization identifies the regions within the field of view likely to contain useful information.

Data captured by each of the three sensor types is provided to temporal synchronization system 138, which includes a processing and storage (e.g., buffers) capable of storing the sensor data provided by the one or more sensors. For example, in some embodiments temporal synchronization system 138 includes a processor and memory (not shown), wherein the memory stores instructions when executed by the processor (or processors) implements a plurality of functions for analyzing the sensor data, including a data fusion module 140, object tracking module 142, and a situational assessment module 144. In addition, memory includes a plurality of buffers (described in more detail with respect to FIG. 2) for storing sensor data provided by the plurality of sensors. For example, in some embodiments temporal synchronization system 138 includes a short buffer 202, medium buffer 204, and long buffer 206 (shown in FIG. 2). Sensor data from the plurality of sensors is stored to each of the short buffer 202, a medium buffer 204, and a large buffer 206. In some embodiments, the most recent data is stored to the short buffer, and as the counters are incremented data is stored to the medium buffer, and then to the long buffer. That is, the buffers each represent a different segment of time, as well as a different length of time. In some embodiments, the short buffer 202 stores data from each of the sensors representing the shortest length of time (e.g., 100 millisecond), the medium buffer 204 stores data from each of the sensors representing a second length of time (e.g., 1 second), and the long buffer 206 stores data from each of the sensors representing a long length of time (e.g., 10 seconds). In other embodiments, the lengths of time may be modified.

As described in more detail with respect to FIGS. 2-6, temporal synchronization system 138 implements a data fusion module 140 configured to analyze sensor data from each of the plurality of sensors and across different lengths of time determined by the plurality of buffers provided to detect and track objects. In response to objects detected and tracked across the plurality of sensors and buffer lengths, a determination is made regarding the likelihood of an unattended occupant. In some embodiments, objects detected and tracked by data fusion module 140 are analyzed by object tracking module 142 within the context of one or more additional inputs. For example, in some embodiments, object tracking module 142 receives one or more inputs from the vehicle (labeled collectively "vehicle inputs 146"), which may include, for example time/data information, location, outside air temperature, driving mode, and platform. In some embodiments, object tracker module 142 utilizes vehicle inputs 146 to provide additional context for the data provided by the one or more sensors. For example, if the outdoor temperature is very high, then the expectation is that thermal data should show an increase in temperature of inanimate objects and possible danger to unattended occupants. Inputs from the vehicle may also be utilized to suspend or otherwise determine that the occupant is no longer unattended. For example, an input providing that the vehicle has been started may indicate that the occupant is no longer unattended. In response, analysis may be suspended or analysis may continue but the responses generated as a result of the analysis may be modified.

In some embodiments, situational assessment module 144 initiates a response to the detection of unattended occupants and based on situational awareness provided by one or more vehicle inputs 146. For example, in some embodiments the response may include generation of one or more outputs 148 including generation of notifications provided to the owner/operator of the vehicle, notification provided to local authorities, and/or local notification (i.e., alarm) provided to local passersby. In some embodiments, the notification may include one or more images captured from the one or more sensors verifying the unattended occupant. In addition to one or more notifications, situational assessment module 144 may initiate one or more vehicle responses including one or more of rolling down windows, starting the vehicle/ air-conditioning/heating system. In some embodiments, a combination of responses may be utilized. For example, in response to an initial detection of an unattended occupant a notification may be generated. In response to rising temperatures within the vehicle beyond some threshold, additional measures may be taken including starting the vehicle/air-conditioning system or rolling down windows.

Figure 2:
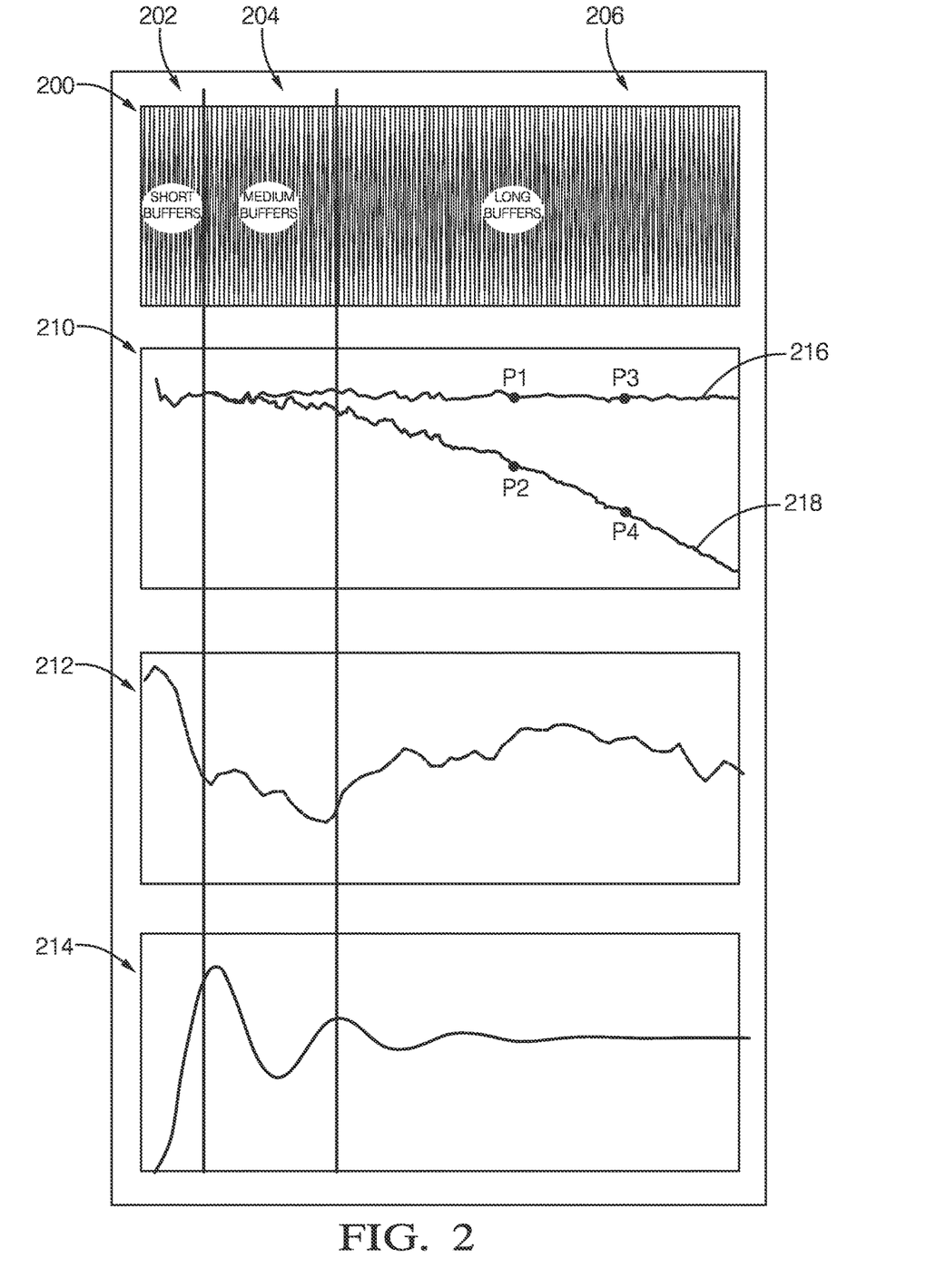
FIG. 2 is a graph illustrating the collection of thermal, radar, and camera data into a plurality of buffers according to some embodiments.

FIG. 2 is a graph illustrating the collection of thermal, radar, and camera data into a plurality of buffers according to some embodiments. In this embodiment, three buffers of varying length are utilized, but in other embodiments fewer or more buffers may be employed. As the name implies, the short buffer 202 represents a shortest length of time (e.g., 100 milliseconds), the long buffer 206 represents the longest length of time (e.g., 10 seconds), with the medium buffer 204 representing a length of time between the short buffer 202 and long buffer 206. The visual depiction of the buffers provided in FIG. 2 is meant to convey the differences in length of time associated with each buffer. The embodiment shown in FIG. 2 illustrates the oldest data being stored to the short buffer 202 and the newest data being stored to the long buffer 206. In some embodiments, the newest data is stored to the short buffer 202, with data from the short buffer migrating to the medium buffer 204 and then to the long buffer 206. In other embodiments, the short buffer 202 stores the most recent data. The data stored in the medium buffer 204 overlaps in time with data stored in the short buffer 202, and likewise data stored in the long buffer 206 overlaps in time with data stored in the medium buffer 204 and short buffer 202.

In some embodiments, the sample rate between the buffers also varies. For example, in some embodiments the short buffer 202 represents the highest sample rate (i.e., shortest length of time between data), while the long buffer 206 utilizes the lowest sample rate. The sample rate determines the frequency content associated with each buffer. That is, the higher the sample rate the higher frequency data can be measured. In some embodiments, the higher sampling rate associated with the short buffer allows higher frequency data (e.g., heart rate, movement, etc.) to be monitored. In some embodiments the sampling rate associated with the various buffers means analysis of each buffer provides a different view of the data being analyzed. For example, thermal data (shown in graph 210) is not likely to change over milliseconds, and therefore high frequency sampling of thermal data will likely not be conclusive regarding the presence/absence of occupants. However, changes in temperature detected over a longer sampling period provided by the long buffer 206 may provide more definitive evidence of the presence of an occupant. In other embodiments, however, the sampling rate associated with each of the buffers remains the same.

The embodiment shown in FIG. 2 illustrates sample data collected in response to an occupant within a vehicle. The top graph 210 illustrates thermal data collected in short, medium and long buffers, respectively. The middle graph 212 illustrates radar data collected in short, medium and long buffers, respectively, and the bottom graph 214 illustrates camera data collected in short, medium, and long buffers, respectively. In this embodiment the outdoor temperature is colder than the initial ambient temperature within the vehicle. As shown in graph 210, initial thermal data collected by the thermal sensor does not detect much difference between the occupant and inanimate objects within the vehicle. However, due to the colder outside temperature the temperature of inanimate objects within the vehicle begin to cool as illustrated by line 218 while the temperature of the occupant remains approximately unchanged as indicated by line 216. As described in more detail with respect to FIG. 3 the difference in temperature between regions within each of the buffers is monitored and utilized to differentiate occupants from inanimate objects. For example, the difference or delta in temperatures between two points (e.g., difference in temperature between points p1 and p2) at the same instant in time may be extracted as a feature and utilized to detect and track occupants. For example, the difference in temperature between the respective points may indicate the presence of an occupant. Additional features may be extracted from the thermal data, including the slope of the change in temperature between points in time. For example, the slope of a line between points p1 and p3 and between points p2 and p4 is another feature that may be extracted and analyzed to detect and track occupants. For example, a relatively flat slope indicates the possible presence of an occupant, in particular if the slope of other points in the vehicle indicate a steeper slope (either cooling or heating). In the example shown in graph 210, the temperature data moves more slowly than the radar or camera data, and therefore this example illustrates that data stored in the long buffer may be particularly useful in detecting occupants.

Graph 212 illustrates radar buffered data stored to the short buffer 202, medium buffer 204 and long buffer 206. Likewise, graph 214 illustrates camera buffered data stored to the short buffer 202, medium buffer 204, and long buffer 206. With respect to the radar data shown in graph 212, it can be easily seen that the data changes much more rapidly than the temperature data. In some embodiments, the interval between samples is shorter with respect to the short buffer 202, and therefore higher frequency content may be detected and measured with respect to radar data stored in the short buffer 202. For example, heartbeats and/or chest movements caused by breathing may be detected by the radar sensor, wherein the frequency content associated with the short buffer 202 may provide particularly relevant data for detecting and tracking occupants. Likewise, the camera data captured by the camera is utilized to detect motion as illustrated in graph 214. Similar to the radar data, the frequency content associated with the short buffer 202 and/or medium buffer 204 is particularly useful in detecting and tracking occupants.

Figure 3:
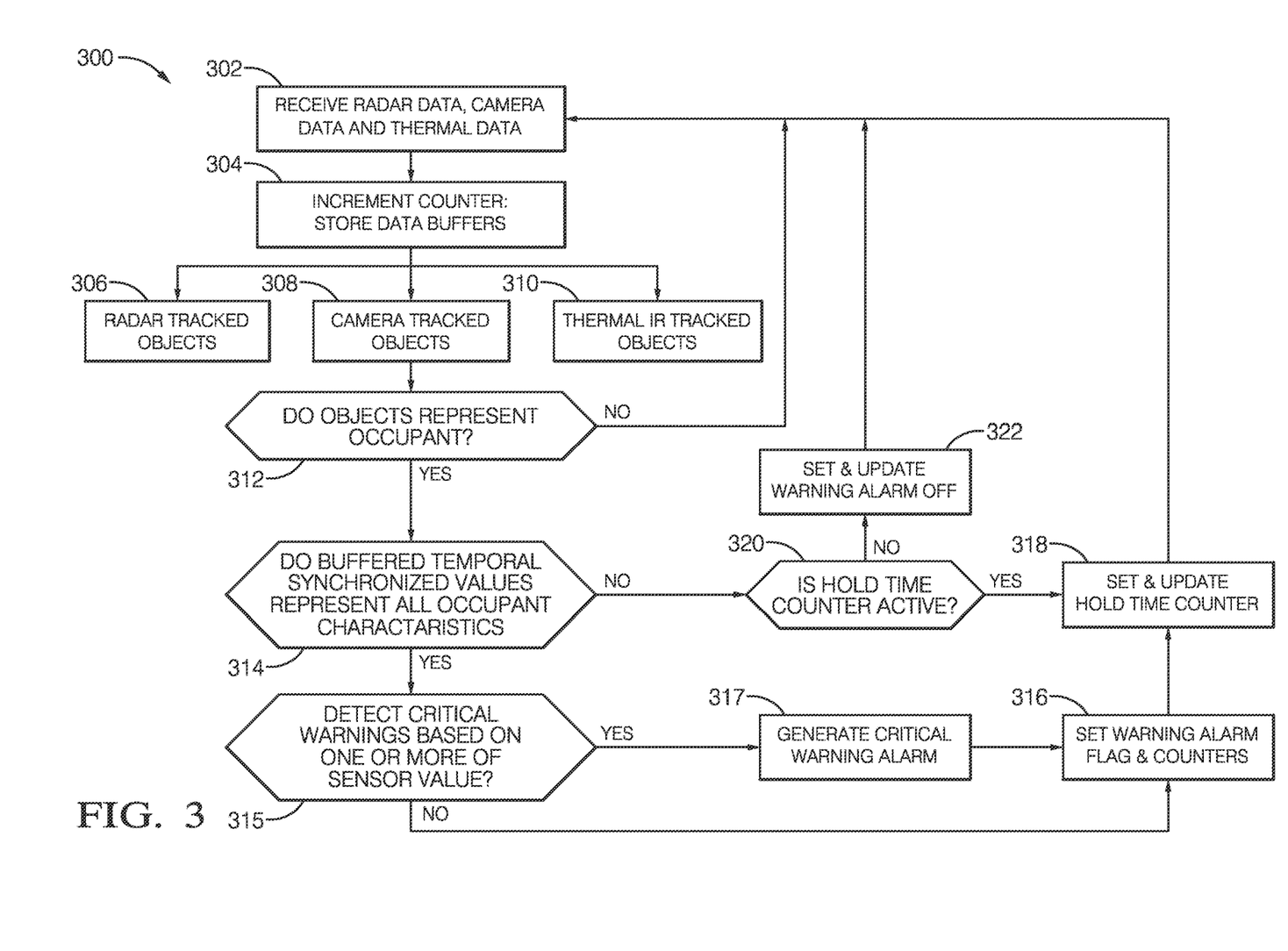
FIG. 3 is a flowchart illustrating a process of fusing data provided by each of the plurality of sensors according to some embodiments.

FIG. 3 is a flowchart illustrating steps utilized by data fusion module 140 (shown in FIG. 1) to combine data from the plurality of sensors according to some embodiments. At step 302, data is received from the plurality of sensors, including camera data from camera 102, radar data from radar sensor 104, and thermal data from thermal/infrared sensor 106. At step 304 counters associated with the buffers are incremented and received data is stored to the buffers (e.g., camera data, thermal data, and radar data). In particular, the counters indicate the location within the buffers that new data should be stored and the old data that is discarded. Incrementing the counter results in data being stored to the next available location as well as the removal of the oldest data.

At steps 306, 308 and 310 sensor data is analyzed to detect the presence of objects indicative of occupants. For example, at step 306 radar data is analyzed in each of the plurality of buffers to detect and track objects indicative of an occupant (discussed in more detail with respect to FIG. 5). Likewise, at step 308 camera data is analyzed in each of the plurality of buffers to detect objects indicative of an occupant (discussed in more detail with respect to FIG. 4) and at step 310 thermal data is analyzed in each of the plurality of buffers to detect objects indicative of an occupant (discussed in more detail in FIG. 6). In some embodiments, the output of each step is an object map identifying regions within the field of view of each sensor that indicates the presence of an occupant tracked based on sensor data collected by that sensor, across each of the plurality of buffers. This may include identification of the region in which the occupant is likely to be located, along with certainty associated with the tracked object. In some embodiments, the output includes an output generated with respect to each of the plurality of buffers such that sensor data from each of the plurality of different buffers can be subsequently utilized in the buffered temporal synchronization analysis. That is, the output provided at step 306 related to radar tracked objects may include the object map but may also include the data associated with each of the respective buffers.

At step 312 the tracked objects provided at steps 306, 308, and 310 are reviewed and utilized to determine whether any of the outputs indicate the presence of an occupant. If none of the outputs indicate the tracking of an object indicative of an occupant, then at step 304 the counter is incremented and the process continues. In cases in which one or more of the buffers are full, incrementing the counter may include overwriting old data in one or more of the buffers. For example, the short buffer is representative of the most recent data (e.g., most recent 100 milliseconds of data). Likewise, the long buffer is representative of the most recent data (e.g., most recent 10 minutes of data). If one or more of the outputs provided at steps 306, 308, and 310 indicates the presence of an occupant, then the method continues at step 314.

At step 314, the tracked objects associated with additional sensors are utilized to verify/monitor the object being tracked using temporal synchronization of the data. At step 314, this may include verifying that objects tracked by a particular set of sensor data correlate with objects being tracked by the other two sets of sensor data. The correlation between tracked objects includes correlating the location of the objects and across each of the different buffers (temporal synchronization). For example, a radar tracked object identified at a first location would be verified by a thermal tracked object identified at the same location. Furthermore, thermal tracked objects identified in the long buffer may be correlated with radar tracked objects identified in the short buffer, wherein synchronization across the buffers is utilized to aid in verifying the presence of occupants. In this way, buffered temporal synchronized values correlates objects tracked by each of the different sensors in space as well as within the plurality of buffers. In some embodiments, if buffered data from each of the plurality of sensors (e.g., radar, camera, and thermal) indicates the presence of an occupant at step 314, then at step 316 warning/alarm flag is set indicating the presence of an occupant. In some embodiments, at step 318 a hold time counter is set and updated to indicate the presence of occupants. The hold time counter may be utilized to maintain alarms and/or warnings previously set for a duration of time. For example, if the buffered temporal synchronized values reviewed at step 314 do not indicate the presence of an occupant, but at step 320 it is determined that the hold time counter is still active (due to a previously detected occupant), then the hold time counter is updated at step 318 (for example, decremented) and the process continues. If the hold time counter is no longer active, then at step 322 warnings and/or alarms are turned OFF. Generation of warning alarms indicates the presence of an occupant.

In some embodiments, if the presence of an occupant is detected at step 314, then at step 315 a determination is made regarding whether a critical warning should be initiated. In some embodiments, critical warnings are only initiated if at step 314 a determination is made that an occupant is located within the vehicle. In some embodiments, critical warnings are issued in response to a determination that the occupants is distressed or conditions within the car are such that the occupant will become distressed. The determination may be based on one or more of the plurality of the sensor data inputs, including radar data, camera data, and/or thermal IR data. For example, in some embodiment thermal feedback associated with a detected occupant is compared to a threshold temperature to determine whether temperature of a detected occupant indicates potential life-threatening condition. For example, in some embodiments if the temperature of an object exceeds a threshold (e.g., 101° F.) this indicates possible hyperthermia (i.e., heatstroke) of the occupant—not merely presence of an occupant. Likewise, in other embodiments a threshold may be utilized to detect whether an occupant has cooled below a dangerous temperature. In some embodiments, in addition to comparison to an absolute temperature (e.g., 101° F.), a delta or change in temperature of a detected occupant may be compared to a threshold value. In general, the human body is able to regulate internal temperature despite increases/decreases to the environmental temperature. An indication that the temperature of the occupant is increasing or decreasing indicates the inability of the body to continue to regulate temperature, and therefore may be indicative of danger to the occupant. In some embodiments, an increase in temperature of the region associated with an occupant greater than a threshold amount (e.g., 2.7° F.) indicates distress of the occupant and may trigger a critical warning. In some embodiments, the rate of change of the temperature of the occupant may also be utilized to determine whether to initiate a critical warning. In some embodiments, children may experience steeper rates of change in temperature as compared to adults and may be less able to mitigate the change in temperature. In some embodiments, a rate of change in temperature of a detected occupant greater than a threshold is utilized to initiate a critical warning.

In other embodiments, in addition to utilization of thermal data, radar data and/or camera data may be utilized to determine whether a critical warning should be initiated. For example, a change in heartbeat (increase or decrease) and/or breathing detected based on the radar data may indicate distressed state of the occupant. In some embodiments, a change in heartbeat and/or breathing is combined with detected changes in temperature to determine whether the occupant is in distress, and therefore whether a critical warning should be initiated.

If at step 315 no critical warning is initiated, then the process continues to step 316 in which warning alarm flags are set. If at step 315 a critical warning is initiated, then at step 317 the critical warning is generated. In some embodiments, a critical warning is generated in response to a determination that the occupant is in imminent danger. As a result, the steps taken in response to a critical warning may be more drastic. In some embodiments, in response to generation of a critical warning, automatic steps are taken by the vehicle to mitigate the condition of the occupant. For example, this may include starting the vehicle and initiating environment controls (e.g., heater, air-conditioning) to mitigate the cabin temperature. This may also include generating local alarms notifying passerby's of the presence of an occupant within the car and the condition of the occupant. In other embodiments, in response to a critical warning messages are communicated from the vehicle to the owner of the vehicle and/or to emergency responders (e.g., 911 dispatch, police, etc.). The process then continues at step 316 with the setting of warning flags and counters.

If at step 314 the buffered temporal synchronized values do not indicate the presence of an occupant, then at step 320 a determination is made whether the hold time counter is active. If the hold time counter is active, then at step 318 the hold time counter is set and updated. If the hold time counter is not active, then at step 322 the warning alarm is turned Off. As described in FIG. 1, in some embodiments additional inputs from the vehicle are utilized to provide situational context to the detected occupants. Thus, even if a warning alarm is set as described with respect to FIG. 3, in some embodiments based on vehicle inputs various types of outputs or actions may be taken by the vehicle.

Figure 4:
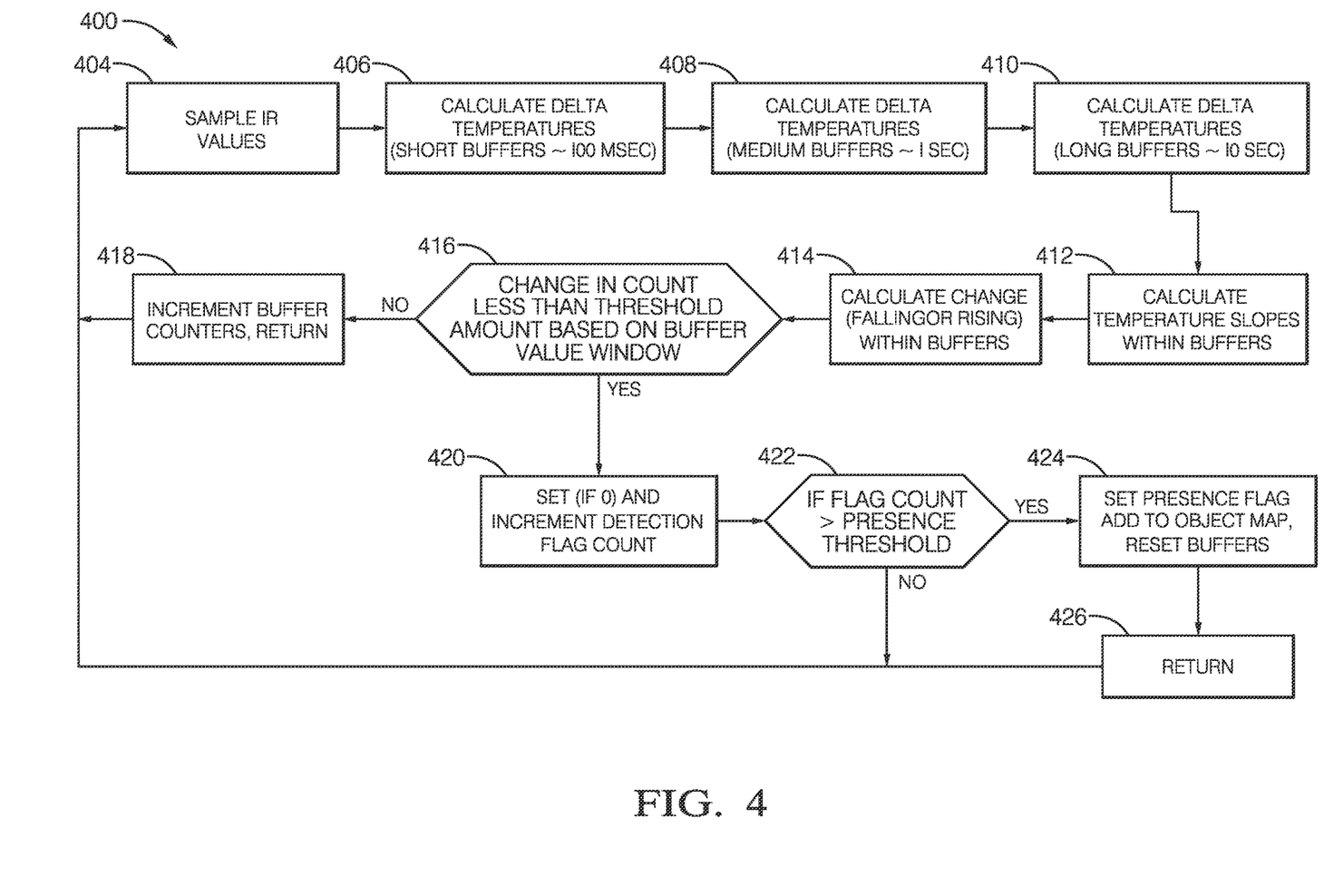
FIG. 4 is a flowchart illustrating a process of analyzing thermal data using a short, medium, and long buffer according to some embodiments.

FIG. 4 is a flowchart illustrating a process of analyzing thermal data using a short, medium, and long buffer according to some embodiments. At step 404, infrared (thermal) data is sampled from the infrared sensor and stored to the plurality of buffers, each having a different length. The thermal data provides a temperature reading for each point within the field of view of the IR sensor. In some embodiments, thermal data may be analyzed by extracting one or more features from the thermal data provided by the IR sensor. For example, the temperature of a person is equal to approximately 37° C. Thus, it is likely that occupants will have a temperature equal approximately to 37° C. In addition, background objects will exhibit changes in temperature, while occupants will maintain a relatively stable temperature even as the environment increases or decreases in temperature. Over extremely small interval of times (e.g., milliseconds) changes in temperature will not be very significant, but over longer intervals of time the change in temperature may be more significant and therefore may provide additional certainty that an object being tracked (i.e., object retaining a relatively constant temperature within a range indicative of an occupant and in light of changes in temperature elsewhere) is an occupant (i.e., person).

In some embodiments, steps 406, 408, 410, 412 and 414 extract one or more features from the thermal data received from the thermal IR sensor. For example, at step 406 the delta (i.e., difference) in temperature is calculated with respect to thermal data stored in the short buffer. The delta represents the difference in temperature between various locations within the field of view of the IR sensor. That is, the calculated delta in temperature may represent the difference in temperature between objects for each sample stored in the short buffer. At step 408 the same step is performed with respect to the medium buffer and at step 410 the same process is performed with respect to the long buffer. For example, with reference to FIG. 2, points $p_1$ and $p_2$ represent temperatures measured at a particular point in time, with the delta representing the difference between the two points $p_1$ and $p_2$. In this example, point p1 is taken at a location that represents an occupant, whereas point p2 is taken with respect to a point that represents background. As described in more detail below, a characteristic of occupants (children, pets) is that they maintain a relatively stable temperature despite changes in the environmental temperature, at least in initially. That is, in response to extreme cold or heat, the interior of a vehicle (e.g., seats, windows) will cool or heat relatively quickly as compared with occupants, resulting in a difference in temperature between the occupant (e.g., measured at point p1) and the background (measured at point p2) that changes as the background temperature continues to increase/decrease while the occupant remains approximately unchanged.

At step 412, temperature slopes are calculated within each of the buffers. The slope represents the rate of change of temperature associated with various points within the field of view of the thermal sensor. For example, with reference again to FIG. 2, points $p_3$ and $p_4$ within the long buffer are illustrated, wherein the calculated slope represents the rate of change of temperature between points $p_1$ and $p_2$ and between points $p_3$ and $p_4$ over the time interval associated with the respective points. For example, in the embodiment shown in FIG. 2, the slope between points $p_1$ and $p_3$ is essentially zero, indicating that the temperature of the object is not changing over time. In contrast, the slope between points $p_2$ and $p_4$ is negative, meaning that the temperature is decreasing over time. Although this example was provided with respect to data measured within the long buffer, the same analysis would be provided with respect to the short buffer and medium buffer.

At step 414, the change (rising or falling) of temperatures within each buffer is determined. For example, in the embodiment shown in FIG. 2, the slope or rate of change between points $p_2$ and $p_4$ is negative, indicating that temperature is falling for at least some locations within the vehicle. A positive sign indicates an increase in temperature, a negative sign indicates a decrease in temperature.

At step 416 one or more of the features extracted from the thermal data at one or more of steps 406, 408, 410, 412, and/or 414 with respect to each of the plurality of buffers is utilized to determine whether the thermal data indicates the presence of an occupant. In some embodiments, the determination at step 416 includes comparing the one or more thermal measurements calculated at steps 406, 408, 410, 412 and/or 414 to threshold values. For example, in some embodiments a change in temperature less than a threshold indicates the presence of an occupant. In some embodiments, the threshold may be determined based on an average change in temperature within the vehicle. In addition, thermal data from each of the plurality of buffers may be utilized to make the determination. For example, thermal data from the short buffer may not include enough change in temperature to verify detection of an occupant, but may provide information regarding temperature of a region remaining with a zone likely to be an occupant. In some embodiments, if analysis of the one or more features at step 416 satisfies the threshold, then at step 420 a flag is set and/or a flag count is incremented, wherein the flag count provides an indication of the number of features that have identified the region as possibly including an occupant. In this embodiment, an increase in the flag count indicates additional thermal data features extracted from the plurality of buffers that corroborates the presence of an occupant. In other embodiments, other methods may be utilized of corroborating analysis across the plurality of buffers to detect and track occupants.

At step 422 the flag count is compared to a threshold value, wherein if the flag count is less than a threshold value this indicates that the presence of an occupant cannot be verified. If the flag count is less than the threshold, then the process returns to step 404 with the sampling of new thermal data and the process continues. If at step 422 the flag count is greater than the threshold, then the presence flag is set and the region corresponding to the flags is added to the object map. The object map is utilized to monitor the areas within the interior of the vehicle that sensor data indicates may include an occupant. In some embodiments, the object map includes regions detected as indicating occupants by each of the plurality of sensors, wherein the object map is shared among the plurality of sensors. The process then continues at step 424 with the sampling of additional thermal data. In some embodiments, the output of the analysis shown in FIG. 4 is an object map that identifies the location of detected and tracked objects. In some embodiments, the output of the analysis shown in FIG. 4 further includes the one or more features extracted with respect to the plurality of buffers. In some embodiments, the object map described with respect to FIG. 4 that is updated based on analysis of thermal features is also utilized in the analysis of camera data and/or radar data, such that the object map reflects objects detected and/or tracked based on each of the plurality of sensors.

Figure 5:
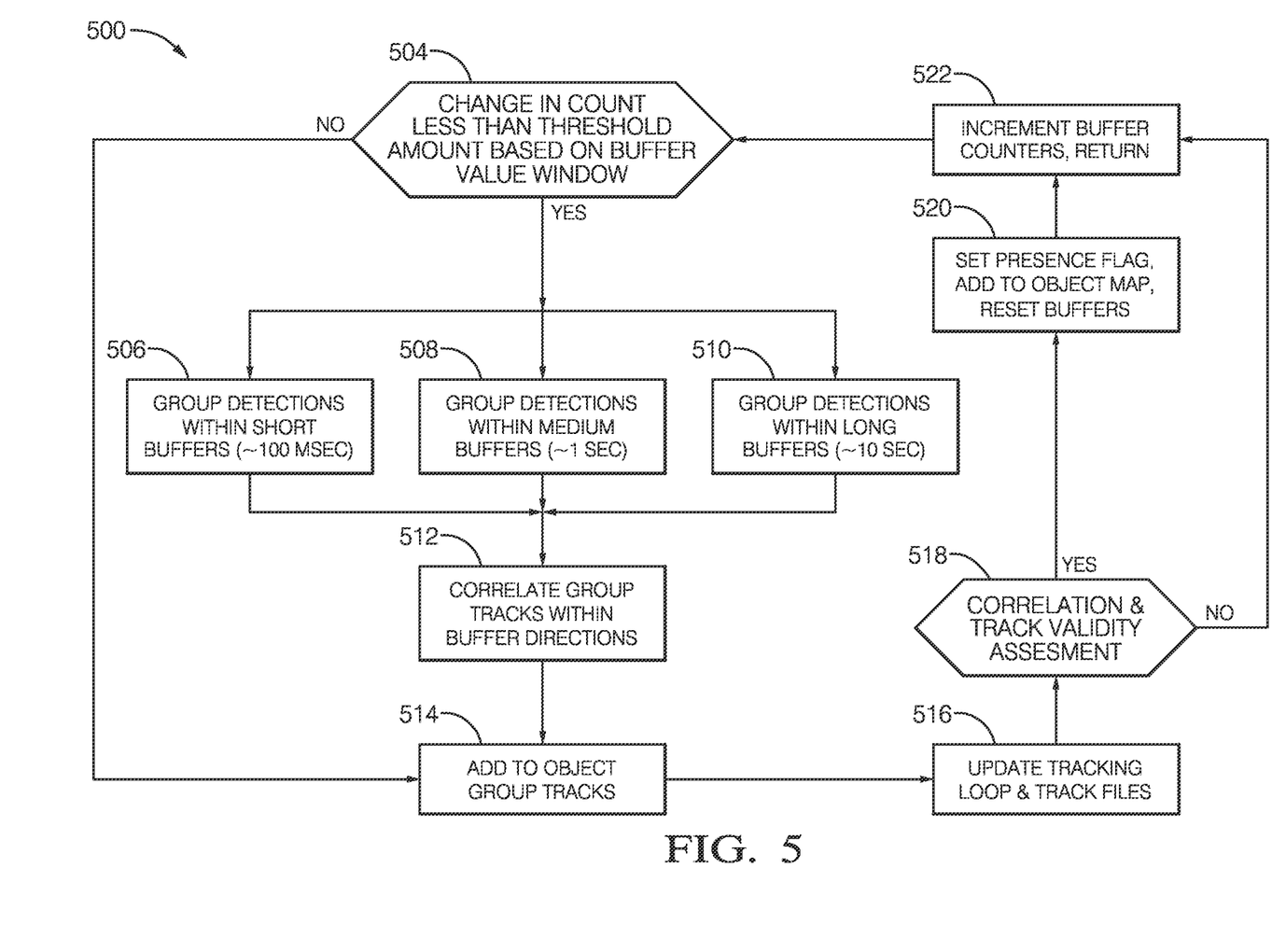
FIG. 5 is a flowchart illustrating a process of analyzing radar data using a short, medium, and long buffer according to some embodiments.

FIG. 5 is a flowchart illustrating a process of analyzing radar data and video data using a short, medium, and long buffer according to some embodiments. In some embodiments, an initial determination is made at step 504 regarding whether the radar data received from the sensor includes ROIs/localization. For example, in the embodiment shown in FIG. 1, radar sensor 104 identified ROIs/localization 128 and provided these ROIs to temporal synchronization system 138. In some embodiments, ROIs/localizations are identified based on movement detected within the interior of the vehicle, including movement associated with heartbeat of an occupant, breathing of an occupant, or general movement of an occupant. In some embodiments if the radar data does not indicate any movement within the interior of the vehicle, then there is no need to correlate tracks as described in more detail at steps 506, 508, 510 and 512. In contrast, if at step 504 there is one or more ROIs provided, then at steps 506, 508, 510 and 512 analysis of the radar data is performed.

At step 506, objects are identified within the short buffer. As described with respect to FIG. 2, above, the short buffer represents the shortest interval of time. In some embodiments, radar data stored in the short buffer is stored at a sample rate that is higher than either the medium buffer or long buffer, and thus provides detection of events at higher frequency levels. At step 506, radar data stored in the short buffer is analyzed to detect one or more features indicative of an occupant. For example, this may include analyzing data for movement, and may further include analyzing radar data for movement indicative of a heart rate and/or breathing pattern indicative of an occupant (e.g., person). Features identified as indicative of an occupant are grouped and provided as an output to subsequent steps in which the group detections are correlated with one another to determined object tracks. In some embodiments, a plurality of group detections may be detected within the short buffer. The same analysis is performed with respect to the medium buffer at step 508 and the long buffer at step 510 in order to group features indicative of an occupant. As described above, the medium buffer is characterized by a longer sample period (e.g., 1 second) than the short buffer, and in some embodiments is characterized by a lower sample rate than the short buffer. Likewise, the long buffer is characterized by a longer still sample period (e.g., 10 seconds) and in some embodiments by an even lower sample rate than either the short buffer or the medium buffer. As a result, the frequency content detected within each of the plurality of buffers may vary, with the short buffer providing the highest frequency content and the long buffer providing lower frequency content. For example, radar data in the short buffer may be utilized to detect heart rate and/or breathing, while radar data in the long buffer may be utilized to detect lower frequency content such as larger movements of an occupant within the interior of the vehicle. With respect to both the medium buffer and long buffer, group detections are identified and provided to step 512 for correlation with the other buffers.

At step 512, the group detections provided with respect to the short buffer, medium buffer and long buffer are correlated with one another to detect objects. For example, a group detection within the short buffer indicating movement within a particular region is correlated with a group detection in the medium buffer and long buffer with respect to the same region. For example, a box falling off of a seat within the vehicle may result in a group detection within the short buffer, but not within the long buffer such that the results are not correlated. In this example, despite the group detection within one of the buffers no object track is generated at step 514. Conversely, a person sitting in a seat may result in detections in each of the three buffers based on heartrate, breathing patterns, and arm/leg movement of the occupant over time. In this case, the group tracks in each of the buffers are correlated with one another and at step 514 the correlated group detections are used to create an object track.

At step 516, tracking files are updated with respect to the object tracks identified at step 514. In some embodiments, tracking files indicate the location of an object being tracked and information regarding the certainty that an object is an occupant. This may include length of time the object has been tracked, attributes of the object being tracked, and location of the object being tracked. At step 518, object tracks are correlated with one another to determine the validity of the assessment. For example, an object tracked over several iterations will likely be identified as a valid track due to the continuity of the track. Conversely, an object tracked intermittently over several iterations without the requisite continuity may be identified as noise. For example, a person or persons walking by the outside of a vehicle may be detected by the radar sensor, but the detection will be intermittent and therefore will not be identified as an occupant. If at step 518 an object track is identified as not representing a valid detection, then at step 522 the buffers are incremented and the process continues at step 504. If at step 518 an object track is identified as representing a valid detection, then at step 520 a presence flag is set and the object is added to the object map. In some embodiments, the object map is described at step 520 is provided with respect to only radar tracked objects. However, in other embodiments the object map updated at step 520 incorporates objects tracked with respect to each of the plurality of sensors. At step 522, the buffer counters are incremented and the process continues at step 504 with the next iteration of radar data.

Figure 6:
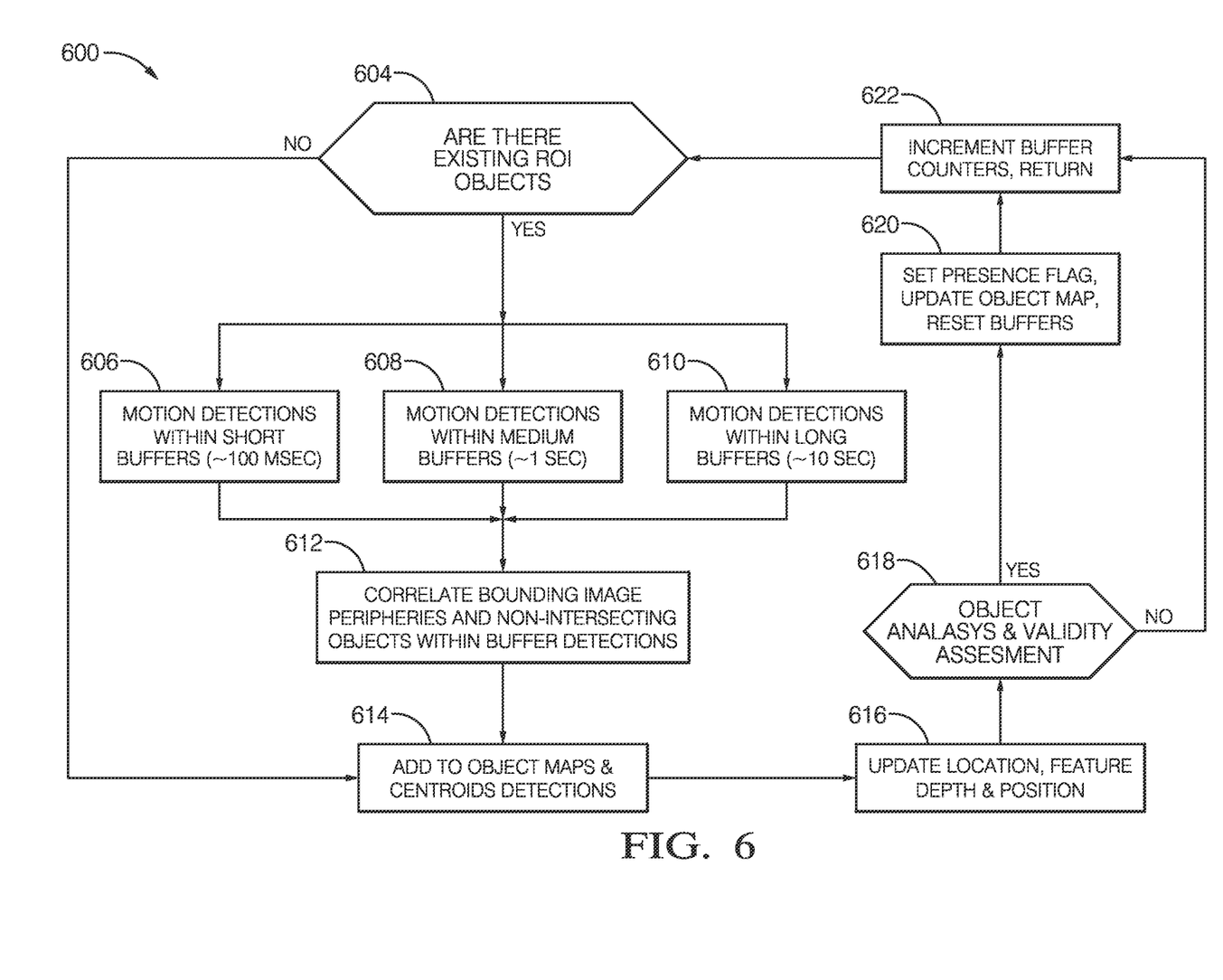
FIG. 6 is a flowchart illustrating a process of analyzing camera data using a short, medium, and long buffer according to some embodiments.

FIG. 6 is a flowchart illustrating a process of analyzing camera data using a short, medium, and long buffer according to some embodiments. In some embodiments, an initial determination is made at step 604 regarding whether the camera data received from the sensor includes ROIs/localization. For example, in the embodiment shown in FIG. 1, camera sensor 102 identified ROIs/localization 116 and provided these ROIs to temporal synchronization system 138. In some embodiments, ROIs/localizations are identified based on one or more features of the camera data such as motion detected, object recognition (e.g., facial detection), or other machine vision techniques. In some embodiments if the camera data does not indicate the presence of ROIs/localizations within the interior of the vehicle, then there is no need to correlate tracks as described in more detail at steps 606, 608, 610 and 612 and the process can continue at step 614. In contrast, if at step 604 there is one or more ROIs provided, then at steps 606, 608, 610 and 612 analysis of the camera data is performed.

At step 606, objects are identified within the camera data stored to the short buffer. As described with respect to FIG. 2, above, the short buffer represents camera data from a period of time (e.g., 100 milliseconds) that is less than the medium buffer and/or long buffer. In some embodiments, camera data stored in the short buffer is stored at a sample rate that is higher than either the medium buffer or long buffer, and thus provides detection of events at higher frequency levels. At step 606, camera data stored in the short buffer is analyzed to detect one or more features indicative of an occupant. For example, this may include analyzing camera data for movement indicative of an occupant (e.g., person). Features identified as indicative of an occupant are grouped and provided as an output to subsequent steps in which the group detections are correlated with one another to determined object tracks. In some embodiments, a plurality of group detections may be detected within the short buffer. The same analysis is performed with respect to the medium buffer at step 608 and the long buffer at step 610 in order to group features indicative of an occupant. As described above, the medium buffer is characterized by a longer sample period (e.g., 1 second) than the short buffer, and in some embodiments is characterized by a lower sample rate than the short buffer. Likewise, the long buffer is characterized by a longer still sample period (e.g., 10 seconds) and in some embodiments by an even lower sample rate than either the short buffer or the medium buffer. As a result, the frequency content detected within each of the plurality of buffers may vary, with the short buffer providing the highest frequency content and the long buffer providing lower frequency content. For example, camera data in the short buffer may be utilized to detect more rapid movements while camera data in the long buffer may be utilized to detect lower frequency content such as larger movements of an occupant within the interior of the vehicle. With respect to both the medium buffer and long buffer, group detections are identified and provided to step 612 for correlation with the other buffers.

At step 612, the group detections provided with respect to the short buffer, medium buffer and long buffer are correlated with one another to detect objects. For example, this may include comparing the bounded peripheries of each object detected at steps 606, 608, and 610 to detect overlap between the peripheries. For example, if the bounded peripheries of an object overlap in each of the three buffers, this provides strong evidence that the motion detected in each buffer is indicative of an occupant and at step 614 the overlapping bounded regions are added to an object map. In other embodiments, in the event bounded regions in each of the buffers overlap with one another, the aggregate bounded region is added to the object map and/or a centroid of the aggregate bounded region is added to the object map.

At step 616, updates are made to the location, feature depth and position of objects added to the object map. At step 618, object tracks are correlated with one another to determine the validity of the assessment. For example, an object tracked over several iterations will likely be identified as a valid track due to the continuity of the track. Conversely, an object tracked intermittently over several iterations without the requisite continuity may be identified as noise. For example, a person or persons walking by the outside of a vehicle may be detected by the camera sensor, but the detection will be intermittent and therefore will not be identified as an occupant. If at step 618 an object track is identified as not representing a valid detection, then at step 622 the buffers are incremented and the process continues. If at step 618 an object track is identified as representing a valid detection, then at step 620 a presence flag is set and the object is added to the object map. In some embodiments, the object map is described at step 620 is provided with respect to only camera tracked objects. However, in other embodiments the object map updated at step 560 incorporates objects tracked with respect to each of the plurality of sensors. At step 622, the buffer counters are incremented and the process continues at step 604 with the next iteration of camera data.

DISCUSSION OF POSSIBLE EMBODIMENTS

The following are non-exclusive descriptions of possible embodiments of the present invention.

In some aspects, a method of detecting occupants within a vehicle includes receiving camera data, thermal data and radar data. The method further includes storing the camera data, the thermal data, and the radar data to at least a first buffer and a second buffer, wherein the first buffer has a length associated with a first duration of time and the second buffer has a length associated with a second duration of time greater than the first duration of time. The camera data stored in the first buffer and the second buffer is analyzed to detect and track camera-based objects. The radar data stored in the first buffer and the second buffer is analyzed to detect and track radar-based objects and the thermal data stored in the first buffer and the second buffer is analyzed to detect and track thermal-based objects. Based on the detected and tracked camera-based objects, radar-based objects, and thermal-based objects, an output is generated indicating whether an occupant has been detected.

The method of the preceding paragraph can optionally include, additionally and/or alternatively any, one or more of the laming features, configurations and/or additional components.

For example, analyzing the thermal data may include extracting one or more features from the thermal data stored in the first buffer and the second buffer and utilizing the extracted features from each of the first buffer and the second buffer to detect and track thermal-based objects.

Features extracted from the thermal data may include a difference in temperature measured between a first point and a second point at a first time.

Features extracted from the thermal data may include a slope between a first point measured at a first time and a second point measured at a second time.

Features extracted from the thermal data may include a sign of the slope.

The method may further include receiving one or more vehicle inputs, wherein generating an output indicating the detection of an occupant utilizes the one or more vehicle inputs.

The vehicle inputs may include one or more of time/data information, location, outside air temperature, driving mode, and platform.

The first buffer may have a first sample rate and the second buffer may have a second sample rate, wherein the first sample rate is greater than the second sample rate.

The method may further include generating a critical warning in response to one or more of the radar data, the thermal data, or the camera data indicating a critical condition.

A critical warning may be generated in response to temperature of the detected occupant exceeding a threshold value.

A critical warning may be generated in response to a change in temperature of the detected occupant exceeding a threshold value.

A critical warning may be generated in response to a change in heartbeat or breathing of the detected occupant in combination with a change in temperature of the detected occupant.

According to some aspects, an intra-vehicle situational awareness system includes a radar sensor configured to collect radar data, a camera configured to collect camera data, and an infrared sensor configured to collect thermal data. The system further includes a buffer for collecting sensor data, the buffer having a first buffer representing a first duration of time and at least a second buffer representing a second duration of time greater than the first duration of time, wherein radar data, camera data and thermal data is stored to both the first buffer and the second buffer. The system further includes a data fusion module configured to detect and track radar-based objects based on radar data provided in the first buffer and the second buffer, camera-based objects based on camera data provided in the first buffer and the second buffer, and thermal-based objects based on thermal data provided in the first buffer and the second buffer, wherein the data fusion module detects occupants based on the radar-based objects, camera-based objects, and thermal-based objects. The generates one or more outputs in response to a detected occupant.

The system of the preceding paragraph can optionally include, additionally and/or alternatively any, one or more of the following features, configurations and/or additional components.

For example, the first buffer may be defined by a first sample rate and the second buffer may be defined by a second sample rate, wherein the first sample rate is greater than the second sample rate.

The thermal-based objects may be detected and tracked based on one or more features extracted from thermal data stored to the first buffer and the second buffer.

Features extracted from the thermal data may include a difference in temperature measured between a first point and a second point at a first time.

Features extracted from the thermal data may further include a slope between a first point measured at a first time and a second point measured at a second time.

Features extracted from the thermal data may further include a sign of the slope.

The invention claimed is:

1. A method of detecting occupants within a vehicle, the method comprising:
   receiving camera data and thermal data;
   analyzing the camera data, wherein the camera data is analyzed over at least a first duration of time to detect one or more camera-based objects;
   analyzing the thermal data, wherein the thermal data is analyzed over at least a second duration of time greater than the first duration of time to detect one or more thermal-based objects;
   cross-correlating locations of the camera-based objects and the thermal-based objects to verify detection of an occupant within the vehicle; and
   generating an output indicating the detection of an occupant based on the tracked camera-based objects, thermal-based objects, and cross-correlation of the respective objects with one another.

2. The method of claim 1, further including tracking the camera-based objects and thermal-based objects to correlate objects tracked in the first duration of time with objects tracked in the second duration of time to verify detection of occupants within the vehicle.

3. The method of claim 2, wherein the camera data is stored to at least a first buffer corresponding with the first duration of time and wherein the thermal data is stored to at least a second buffer corresponding with the second duration of time.

4. The method of claim 3, wherein the first buffer stores the most recent data, wherein data from the first buffer is subsequently saved to the second buffer.

5. The method of claim 3, wherein the second buffer stores the most recent data, wherein data from the second buffer is subsequently saved to the first buffer.

6. The method of claim 1, wherein analyzing the thermal data includes extracting one or more features from the thermal data corresponding with the second duration of time to detect and track thermal-based objects.

7. The method of claim 6, wherein features extracted from the thermal data include a difference in temperature measured between a first point and a second point at a first instant in time.

8. The method of claim 6, wherein features extracted from the thermal data include a slope between a first point measured at a first time and a second point measured at a second time, wherein a difference between the first time and the second time is less than or equal to the second duration of time.

9. The method of claim 1, wherein camera data is analyzed over the first duration of time and the second duration of time.

10. The method of claim 1, wherein thermal data is analyzed over the first duration of time and the second duration of time.

11. The method of claim 1, further including receiving radar data, wherein the radar data is analyzed over the first duration of time, the second duration of time, or both the first duration of time and the second duration of time to detect and track radar-based objects.

12. The method of claim 11, further including tracking the radar-based objects, camera-based objects, and thermal-based objects tracked to correlate objects tracked in the first duration of time with objects tracked in the second duration of time to verify detection of occupants within the vehicle.

13. An intra-vehicle situational awareness system, the system comprising:
   a camera configured to collect camera data utilized to detect and track camera-based objects within the vehicle;
   an infrared sensor configured to collect thermal data utilized to detect and track infrared-based objects within the vehicle;
   a processor for implementing a data fusion module configured to cross-correlate locations of the camera-based objects and the thermal-based objects to verify detection of an occupant within the vehicle, wherein the data fusion module analyzes the camera data over a first duration of time to detect and track one or more of camera-based objects, and analyzes the thermal data over a second duration of time greater than the first duration of time to detect and track one or more of thermal-based objects; and
   an output/warning system configured to generate an alert in response to a verified detection of an occupant within the vehicle.

14. The intra-vehicle situational awareness system of claim 13, wherein the data fusion module correlates camera-based objects and thermal-based objects with one another in both time and space.

15. The intra-vehicle situational awareness system of claim 13, wherein the data fusion module includes at least a first buffer for storing the camera data over the first duration of time and at least a second buffer for storing the infrared data over the second duration of time.

16. The intra-vehicle situational awareness system of claim 13, further including:
an object tracking module configured to receive input from the data fusion module regarding the verified detection of occupants and further configured to receive vehicle inputs from the vehicle, wherein the vehicle inputs are utilized to provide context to detection of the occupant within the vehicle.

17. The intra-vehicle situational awareness system of claim 16, wherein the vehicle input includes one or more of time/data information, location, outside air temperature, driving mode, and platform.

18. The intra-vehicle situational awareness system of claim 13, wherein the output/warning system further includes a situational assessment module that initiates a vehicle response including one or more of rolling down windows and starting the vehicle/air-conditioning/heating system.

19. The intra-vehicle situational awareness system of claim 13, wherein the output/warning system generates an output that includes one or more of a local notification provided to a local passerby, notification provided to local law enforcement, and a notification provided to an owner of the vehicle.

20. The intra-vehicle situational awareness system of claim 13, further including a radar sensor configured to collect radar data utilized to detect and track radar-based objects within the vehicle, wherein the data fusion module cross-correlates locations of the camera-based objects and thermal based objects with the radar-based objects to verify detection of an occupant within the vehicle.

* * * * *